(12) United States Patent
Wu et al.

(10) Patent No.: US 8,300,937 B2
(45) Date of Patent: Oct. 30, 2012

(54) IMAGE SEGMENTATION METHOD AND SYSTEM BASED ON REGION FEATURES OF PIXELS

(75) Inventors: Yi-Ta Wu, Taipei County (TW); Ming-Yu Shih, Taoyuan County (TW); Chung-Hsien Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 980 days.

(21) Appl. No.: 12/343,403

(22) Filed: Dec. 23, 2008

(65) Prior Publication Data
US 2010/0124375 A1    May 20, 2010

(30) Foreign Application Priority Data
Nov. 20, 2008   (TW) .............................. 97144882 A

(51) Int. Cl.
*G06K 9/32*   (2006.01)
(52) U.S. Cl. ..................................................... 382/173
(58) Field of Classification Search ........... 382/173–180
See application file for complete search history.

(56) References Cited

U.S. PATENT DOCUMENTS

| | | | |
|---|---|---|---|
| 6,704,456 B1 * | 3/2004 | Venable | 382/266 |
| 6,757,444 B2 * | 6/2004 | Matsugu et al. | 382/283 |
| 6,842,541 B2 | 1/2005 | Curry | |
| 6,898,314 B2 | 5/2005 | Kung et al. | |
| 6,898,316 B2 * | 5/2005 | Zhou | 382/190 |
| 7,336,826 B2 | 2/2008 | Shin | |
| 7,366,348 B2 | 4/2008 | Watson | |
| 7,386,169 B2 * | 6/2008 | Lin | 382/173 |
| 2003/0206645 A1 * | 11/2003 | Okazaki et al. | 382/117 |
| 2004/0190779 A1 * | 9/2004 | Sarachik et al. | 382/199 |
| 2006/0140497 A1 * | 6/2006 | Kondo et al. | 382/254 |
| 2007/0065009 A1 * | 3/2007 | Ni et al. | 382/173 |
| 2007/0116377 A1 * | 5/2007 | Kondo et al. | 382/274 |
| 2008/0001969 A1 * | 1/2008 | Kondo et al. | 345/633 |

FOREIGN PATENT DOCUMENTS

TW   200703148   1/2007

OTHER PUBLICATIONS

Taiwan Patent Office, Office Action, Patent Application Serial No. 097144882, May 25, 2012, Taiwan.
David A. Bader et al. "Parallel Algorithms for Image Enhancement and Segmentation by Region Growing with an Experimental Study", Proceedings of IPPS '96, p. 414-423, IEEE, US.
Luc Vincent et al. "Watersheds in Digital Spaces: An Efficient Algorithm Based on Immersion Simulations", IEEE Transactions on Pattern Analysis and Machine Intelligence, vol. 13, No. 6, Jun. 1991, p. 583-598, US.

(Continued)

*Primary Examiner* — Jingge Wu

(57) ABSTRACT

A pixel region-based image segmentation method is disclosed. When an input image is retrieved, pixels thereof are sequentially scanned row by row. Signs of unmarked pixels of the input image are determined according to region features of neighboring pixels of each pixel and pixel update information is recorded to generate a region sign update data table and a region sign feature data table. The pixels of the input frame are further scanned row by row to retrieve signs of the pixels and region signs of the pixels are determined and updated according to the region sign update data table.

14 Claims, 14 Drawing Sheets

OTHER PUBLICATIONS

Kostas Haris et al. "Hybrid Image Segmentation Using Watersheds and Fast Region Merging", IEEE Transaction on Image Processing, vol. 7, No. 12, Dec. 1998, p. 1684-1699, US.

Orlando J. Tobias et al. "Image Segmentation by Histogram Thresholding Using Fuzzy Sets", IEEE Transaction on Image Processing, vol. 11, No. 12, Dec. 2002, p. 1457-1465, US.

Kenji Suzuki et al. "Linear-time connected-component labeling based on sequential local operations", Computer Vision and Image Understanding 89 (2003) p. 1-23, Elsevier Science, US.

Lifeng He et al. "A Run-Based Two-Scan Labeling Algorithm", IEEE Transaction on Image Processing, vol. 17, No. 5, May 2008, p. 749-756, US.

Yi-Ta Wu et al. "A top-down region dividing approach for image segmentation", Pattern Recognition 41, 2008, p. 1948-1960, Elsevier, US.

Khotanzad, A. et al. "Unsupervised segmentation of textured images by edge detection in multidimensional feature", Pattern Analysis and Machine Intelligence, IEEE Transactions on Pattern Analysis and Machine Intelligence, vol. 11, Issue 4, Apr. 1989, p. 414-421, US.

\* cited by examiner

| | Currently Pixel | Marking Results | | | | Region-sign Feature Table | | | | Region-sign Update Table |
|---|---|---|---|---|---|---|---|---|---|---|
| | | | | | | Sign | Pixel Number | Brightness Amount | Average Brightness | Signs for Updating |
| (1) | 168 130 128<br>166 164 126<br>127 128 124 | A | — | — | — | A<br>— | 1<br>— | 168<br>— | 168<br>— | — |
| (2) | 168 130 128<br>166 164 126<br>127 128 124 | A | B | — | — | A<br>B | 1<br>1 | 168<br>130 | 168<br>130 | — |
| (3) | 168 130 128<br>166 164 126<br>127 128 124 | A | B | B | — | A<br>B | 1<br>2 | 168<br>258 | 168<br>129 | — |

| Currently Pixel | | | |
|---|---|---|---|
| 168 | 130 | 128 | |
| | 166 | 126 | 124 |
| 127 | 164 | 128 | |

Marking Results

| A | B | B |
|---|---|---|
| A | — | — |
| — | — | — |

Region-sign Feature Table

| Sign | Pixel Number | Brightness Amount | Average Brightness |
|---|---|---|---|
| A | 2 | 334 | 167 |
| B | 2 | 258 | 129 |

Region-sign Update Table

| Signs for Updating |
|---|
| — |
| — |

(5)

| 168 | 130 | 128 | |
|---|---|---|---|
| | 166 | 164 | 126 |
| 127 | | 128 | 124 |

Marking Results

| A | B | B |
|---|---|---|
| A | A | — |
| — | — | — |

Region-sign Feature Table

| Sign | Pixel Number | Brightness Amount | Average Brightness |
|---|---|---|---|
| A | 3 | 498 | 166 |
| B | 2 | 258 | 129 |

Region-sign Update Table

| Signs for Updating |
|---|
| — |
| — |

(6)

| 168 | 130 | 128 | |
|---|---|---|---|
| | 166 | 126 | |
| 127 | 164 | 128 | 124 |

Marking Results

| A | B | B |
|---|---|---|
| A | A | B |
| — | — | — |

Region-sign Feature Table

| Sign | Pixel Number | Brightness Amount | Average Brightness |
|---|---|---|---|
| A | 3 | 498 | 166 |
| B | 3 | 384 | 128 |

Region-sign Update Table

| Signs for Updating |
|---|
| — |
| — |

| Currently Pixel | Marking Results | | | Region-sign Feature Table | | | | Region-sign Update Table |
|---|---|---|---|---|---|---|---|---|
| | | | | Sign | Pixel Number | Brightness Amount | Average Brightness | Signs for Updating |
| (7) 168 130 128<br>166 164 126<br>127 128 124 | A | B | B | A | 3 | 498 | 166 | — |
| | A | A | B | B | 3 | 384 | 128 | |
| | C | — | — | C | 1 | 127 | 127 | — |
| (8) 168 130 128<br>166 164 126<br>127 128 124 | A | B | B | A | 3 | 498 | 166 | — |
| | A | A | B | B | 4 | 512 | 128 | B=C |
| | C | B | — | C | 1 | 127 | 127 | — |
| (9) 168 130 128<br>166 164 126<br>127 128 124 | A | B | B | A | 3 | 498 | 166 | — |
| | A | A | B | B | 5 | 636 | 127 | B=C |
| | C | B | B | C | 1 | 127 | 127 | — |

Currently Pixel:

| 168 | 130 | 128 |
|---|---|---|
| 166 | 164 | 126 |
| 127 | 128 | 124 |

Marking Results:

| A | — | — |
|---|---|---|
| — | — | — |
| — | — | — |

Region-sign Feature Table:

| Sign | Pixel Number | Brightness Amount | Average Brightness | Final Sign |
|---|---|---|---|---|
| A | 1 | 168 | 168 | A |
| — | — | — | — | — |

(2)

Currently Pixel:

| 168 | 130 | 128 |
|---|---|---|
| 166 | 164 | 126 |
| 127 | 128 | 124 |

Marking Results:

| A | — | — |
|---|---|---|
| B | — | — |
| — | — | — |

Region-sign Feature Table:

| Sign | Pixel Number | Brightness Amount | Average Brightness | Final Sign |
|---|---|---|---|---|
| A | 1 | 168 | 168 | A |
| B | 1 | 130 | 130 | B |

(3)

Currently Pixel:

| 168 | 130 | 128 |
|---|---|---|
| 166 | 164 | 126 |
| 127 | 128 | 124 |

Marking Results:

| A | — | — |
|---|---|---|
| B | B | — |
| — | — | — |

Region-sign Feature Table:

| Sign | Pixel Number | Brightness Amount | Average Brightness | Final Sign |
|---|---|---|---|---|
| A | 1 | 168 | 168 | A |
| B | 2 | 258 | 129 | B |

Region-sign Feature Table

(4)

Currently Pixel:
| 168 | 130 | 128 |
|---|---|---|
| 166 | 164 | 126 |
| 127 | 128 | 124 |

Marking Results:
| A | B | B |
|---|---|---|
| A | — | — |
| — | — | — |

| Sign | Pixel Number | Brightness Amount | Average Brightness | Final Sign |
|---|---|---|---|---|
| A | 2 | 334 | 167 | A |
| B | 2 | 258 | 129 | B |

(5)

Currently Pixel:
| 168 | 130 | 128 |
|---|---|---|
| 166 | 164 | 126 |
| 127 | 128 | 124 |

Marking Results:
| A | B | B |
|---|---|---|
| A | A | — |
| — | — | — |

| Sign | Pixel Number | Brightness Amount | Average Brightness | Final Sign |
|---|---|---|---|---|
| A | 3 | 498 | 166 | A |
| B | 2 | 258 | 129 | B |

(6)

Currently Pixel:
| 168 | 130 | 128 |
|---|---|---|
| 166 | 164 | 126 |
| 127 | 128 | 124 |

Marking Results:
| A | B | B |
|---|---|---|
| A | A | B |
| — | — | — |

| Sign | Pixel Number | Brightness Amount | Average Brightness | Final Sign |
|---|---|---|---|---|
| A | 3 | 498 | 166 | A |
| B | 3 | 384 | 128 | B |

FIG. 7B

Region-sign Feature Table (7)

| Currently Pixel | | | Marking Results | | | Sign | Pixel Number | Brightness Amount | Average Brightness | Final Sign |
|---|---|---|---|---|---|---|---|---|---|---|
| 168 | 130 | 128 | A | B | B | A | 3 | 498 | 166 | A |
| 166 | 164 | 126 | A | A | B | B | 3 | 384 | 128 | B |
| 127 | 128 | 124 | C | — | — | C | 1 | 127 | 127 | C |

(8)

| Currently Pixel | | | Marking Results | | | Sign | Pixel Number | Brightness Amount | Average Brightness | Final Sign |
|---|---|---|---|---|---|---|---|---|---|---|
| 168 | 130 | 128 | A | B | B | A | 3 | 498 | 166 | A |
| 166 | 164 | 126 | A | A | B | B | 4 | 512 | 128 | B |
| 127 | 128 | 124 | C | C | — | C | 1 | 127 | 127 | B |

(9)

| Currently Pixel | | | Marking Results | | | Sign | Pixel Number | Brightness Amount | Average Brightness | Final Sign |
|---|---|---|---|---|---|---|---|---|---|---|
| 168 | 130 | 128 | A | B | B | A | 3 | 498 | 166 | A |
| 166 | 164 | 126 | A | A | B | B | 5 | 636 | 127 | B |
| 127 | 128 | 124 | C | B | B | C | 1 | 127 | 127 | B |

FIG. 7C

| Sign | Pixel Number | Brightness Amount | Average Brightness | Final Sign |
|---|---|---|---|---|
| A | 3 | 498 | 166 | A |
| B | 5 | 636 | 127 | B |
| C | 1 | 127 | 127 | B |

C=B

| A | B | B |
| A | A | B |
| C | B | B |

⇒

| A | B | B |
| A | A | B |
| B | B | B |

⇒

| 168 | 166 | 127 |
| 130 | 164 | 128 |
| 128 | 126 | 124 |

FIG. 7D

IMAGE SEGMENTATION METHOD AND SYSTEM BASED ON REGION FEATURES OF PIXELS

CROSS REFERENCE TO RELATED APPLICATIONS

This application claims priority of Taiwanese Patent Application Serial No. 097144882, filed on Nov. 20, 2008, the entirety of which is incorporated by reference herein.

BACKGROUND OF THE INVENTION

1. Field of the Invention

The invention relates to image segmentation methods, and more particularly to an image segmentation method and system based on region features of pixels.

2. Description of the Related Art

"Image segmentation" segments target objects from an input image, which is applied to image recognition, image compression, image search, and monitor systems. Conventional image segmentation methods comprise a histogram-based image segmentation method, an edge-based image segmentation method, and a region-based image segmentation method.

The histogram-based image segmentation method analyzes the histogram of the whole or a portion of an input image to determine a proper threshold for image segmentation. The edge-based image segmentation method analyzes brightness variations between an image object and the background of the image object to find the edge of the image object for image segmentation. The region-based image segmentation method determines brightness similarities between local object images for image segmentation.

The histogram-based image segmentation method is simple and easy to implement but determination of a proper threshold is a big challenge. Additionally, analyzing the histogram without referring to region features of an image may provide tolerance for image noise but does not generate acceptable segmentation results for complicated images.

The edge-based image segmentation method focuses on analyzing brightness variations of an image that is sensitive to noise reactions. Additionally it is difficult to accomplish image segmentation based on unobvious edges if brightness of an image object is slowly and progressively increasing or decreasing.

The region-based image segmentation method must first designate seeds and repeatedly scans pixels of an image. Next, region growing is performed from the seeds by collecting similar neighboring pixels, thus completing image segmentation and the region-based image segmentation method is sensitive to noise reactions and causes over segmentation.

Connected component labeling assigns different marks to each image object to efficiently use and analyze image segmentation results. For the histogram-based and edge-based image segmentation methods, when the image segmentation is complete, connected components labeling is additionally performed to mark each of the segmented objects.

When an image is segmented using the region-based image segmentation method, individual marks can be simultaneously assigned to each of the segmented regions. However, such kind of image segmentation methods must perform multiple image processing methods to reduce interference generated by noise. Additionally, selection of seeds and repeated time-consuming operations are inefficient.

Current image segmentation technology is pixel-based and classifies neighboring pixels having similar features to regions providing identical signs, thereby to complete image segmentation. However, the major deficiency of current image segmentation methods with pixel-based comparison is that the segmentation result is highly sensitive to noise. In other words, current image segmentation methods must remove noise using image processing methods comprising, for example, smoothing, edge enhancement, color quantization, and the like.

Thus, an image segmentation method and system based on region features of pixels is desirable, synchronously performing image segmentation and object marking and providing real-time requirements for high performance.

BRIEF SUMMARY OF THE INVENTION

Image segmentation methods based on region features of pixels are provided. An exemplary embodiment of an image segmentation method based on region features of pixels comprises the following. When an input image is retrieved, pixels of the input image are sequentially scanned row by row. Signs of unmarked pixels of the input image are determined according to region features of neighboring pixels for each of the pixels of the input image. A region-sign feature table is updated according to pixel signs of the input image. The updated pixel signs are recorded to generate a region-sign update table. The pixels of the input image are sequentially scanned row by row. Region signs of related pixels are updated according to the region-sign update table.

Another embodiment of an image segmentation method based on region features of pixels comprises the following. An input image retrieves and divides the input image to an n×m image. An unmarked pixel of the input image is retrieved. Region signs of neighboring pixels and features of the unmarked pixel are retrieved. Feature difference between the unmarked pixel and neighboring regions are calculated. A sign of the unmarked pixel is determined according to the feature difference and a region-sign feature table and a region-sign update table are updated according to the determined sign of the unmarked pixel. It is determined whether there are unmarked pixels that have not yet been processed. The next unmarked pixel is retrieved from the input image if there are unmarked pixels that have not yet been processed and the described steps are repeated. All the pixels of the input image are sequentially scanned row by row according to the region-sign update table, if there are no unmarked pixels that have not yet been processed, to update the region sign of the determined pixel, thereby completing image segmentation.

An image segmentation systems based on region features of pixels are provided. An exemplary embodiment of an image segmentation system based on region features of pixels comprises a database, a scanning unit, a processing unit, and a recording unit. The database comprises a region-sign feature table and a region-sign update table. The scanning unit retrieves an input image and sequentially scans pixels of the input image row by row. The processing unit retrieves region features of each of the neighboring pixels according to the scanning results and determines signs of unmarked pixels of the input image according to the region features of the neighboring pixels. The recording unit records the updated pixel signs in the region-sign update table. The scanning unit further sequentially scans the pixels of the input image row by row and the recording unit updates region signs of related pixels according to the region-sign update table.

Another embodiment of an image segmentation system based on region features of pixels comprises a database, a scanning unit, a processing unit, and a recording unit. The database comprises a region-sign feature table and a region-sign update table. The scanning unit retrieves and divides an input image to an n×m image and sequentially scans the n×m image row by row. The processing unit retrieves an unmarked pixel of the input image, retrieves region signs of neighboring pixels and features of the unmarked pixel, calculates feature difference between the unmarked pixel and neighboring regions, and determines a sign of the unmarked pixel according to the feature difference. The recording unit updates the region-sign feature table and the region-sign update table according to the determined sign of the unmarked pixel. The scanning unit determines whether there are unmarked pixels that have not yet been processed, retrieves the next unmarked pixel from the input image if there are unmarked pixels that have not yet been processed and repeats the previously described steps, and sequentially scans all the pixels of the input image row by row according to the region-sign update table, if there are no unmarked pixels that have not yet been processed, to update the region sign of the determined pixel, thereby completing image segmentation.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5A-5E are workflows of pixel marking of the present invention;

FIG. 7A~7D are workflows of pixel marking of the present invention.

DETAILED DESCRIPTION OF THE INVENTION

Figure 1:
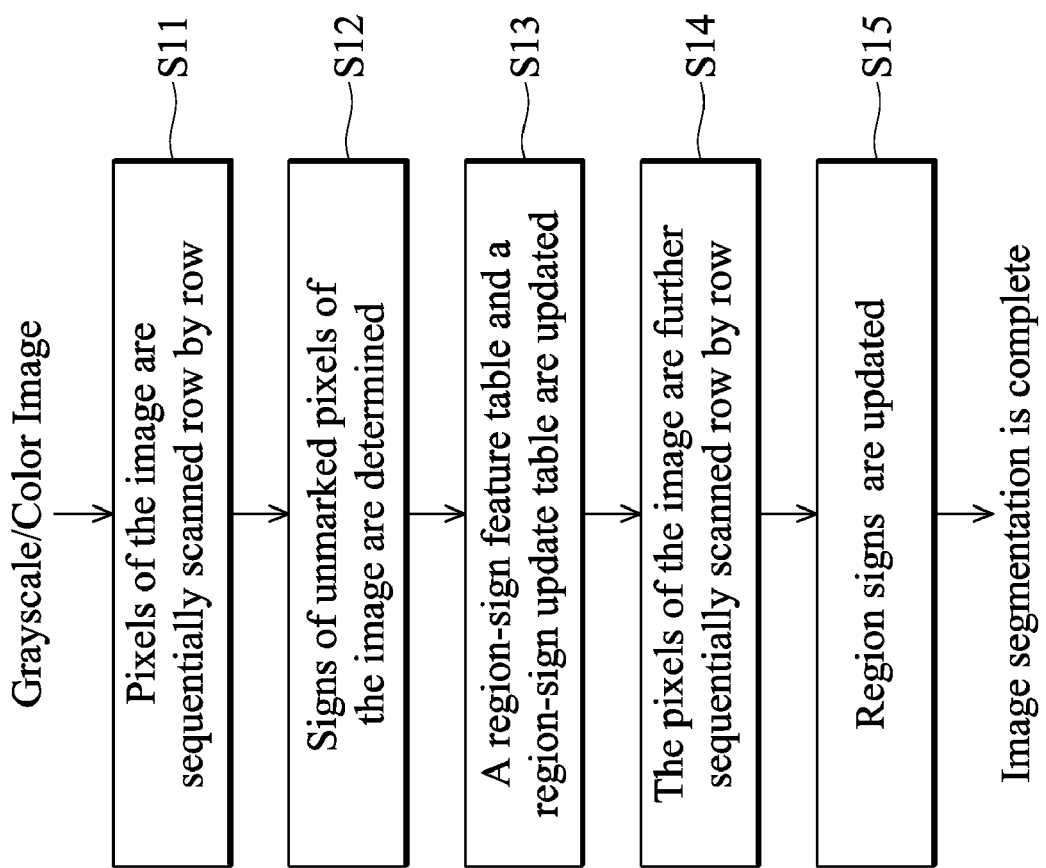
FIG. 1 is a flowchart of an image segmentation method based on region features of pixels of the present invention.

Several exemplary embodiments of the invention are described with reference to FIGS. 1 through 7, which generally relate to image segmentation based on region features of pixels. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an image segmentation method and system based on region features of pixels.

An embodiment of the image segmentation method and system based on region features of pixels considers human vision and perception and, when a region sign of an unmarked pixel is determined, compares region features of neighboring pixels instead of pixel features of neighboring pixels. The region features of neighboring pixels indicate features of a region sign belonging to a pixel. Additionally, to efficiently mark segmented objects, region connected threshold is introduced for binary connected component labeling. Thus, segmenting color images and marking segmented objects can be simultaneously achieved. Meanwhile, two times of row-by-row pixel scanning can synchronously perform image segmentation and object marking, thus providing real-time requirements for high performance FIG. 1 is a flowchart of an image segmentation method based on region features of pixels of the present invention.

When a grayscale/color image is retrieved, pixels of the image are sequentially scanned row by row (step S11), signs of unmarked pixels of the image are determined according to region features of neighboring pixels (step S12), and a region-sign feature table and a region-sign update table are updated (step S13). Next, the pixels of the image are further sequentially scanned row by row (step S14) and resulting region signs, which should be identical but are different, from scanning sequence are correctly updated (step S15).

Figure 2:
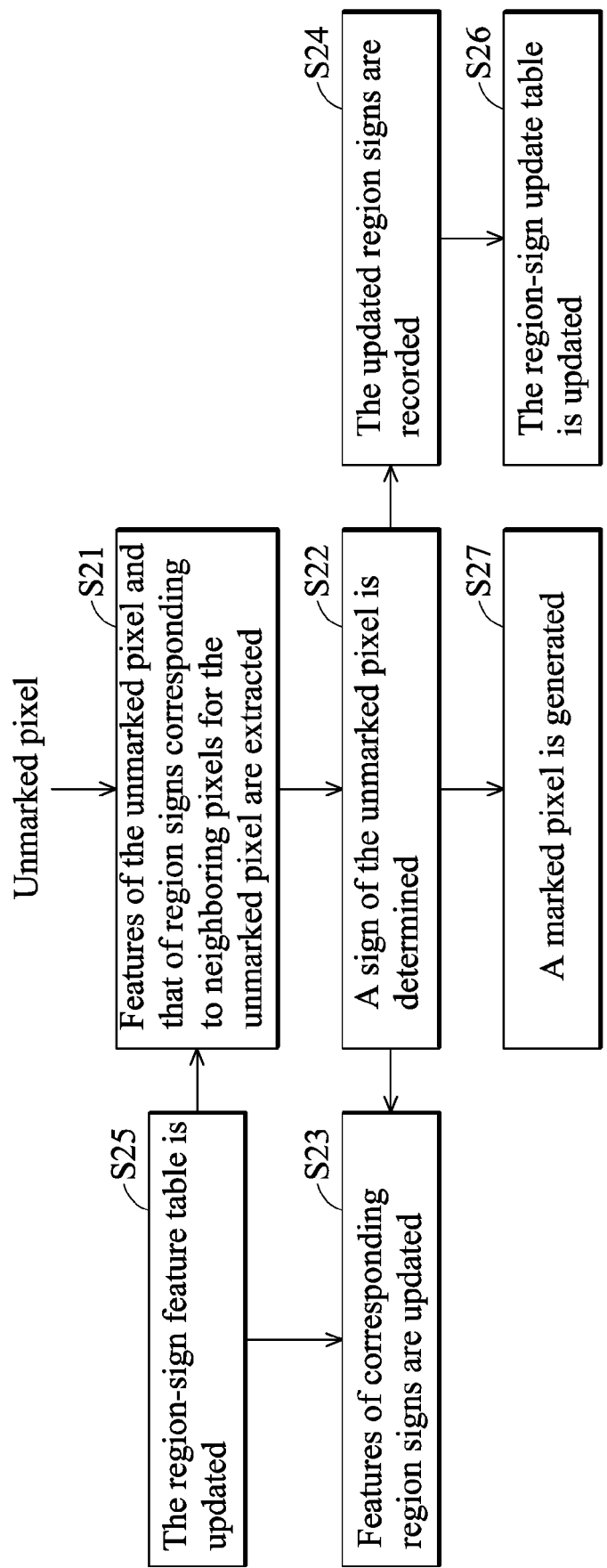
FIG. 2 is a schematic view of a method for determining a region sign of an unmarked pixel of the present invention.

FIG. 2 is a schematic view of a method for determining a region sign of an unmarked pixel of the present invention.

When an unmarked pixel is obtained, features of the unmarked pixel and that of region signs corresponding to neighboring pixels for the unmarked pixel are extracted (step S21). The features of the unmarked pixel are compared with the features of region signs corresponding to the neighboring pixels to determine a sign of the unmarked pixel (step S22). Features of corresponding region signs are updated according to the determined sign of the unmarked pixel (step S23) and the updated region signs are recorded (step S24). The region-sign feature table and the region-sign update table are updated (steps S25 and S26) so that the unmarked pixel becomes a marked pixel (step S27).

In order to prevent multiple image preprocessing operations to reduce processing time, region features of neighboring pixels are introduced.

Figure 3:
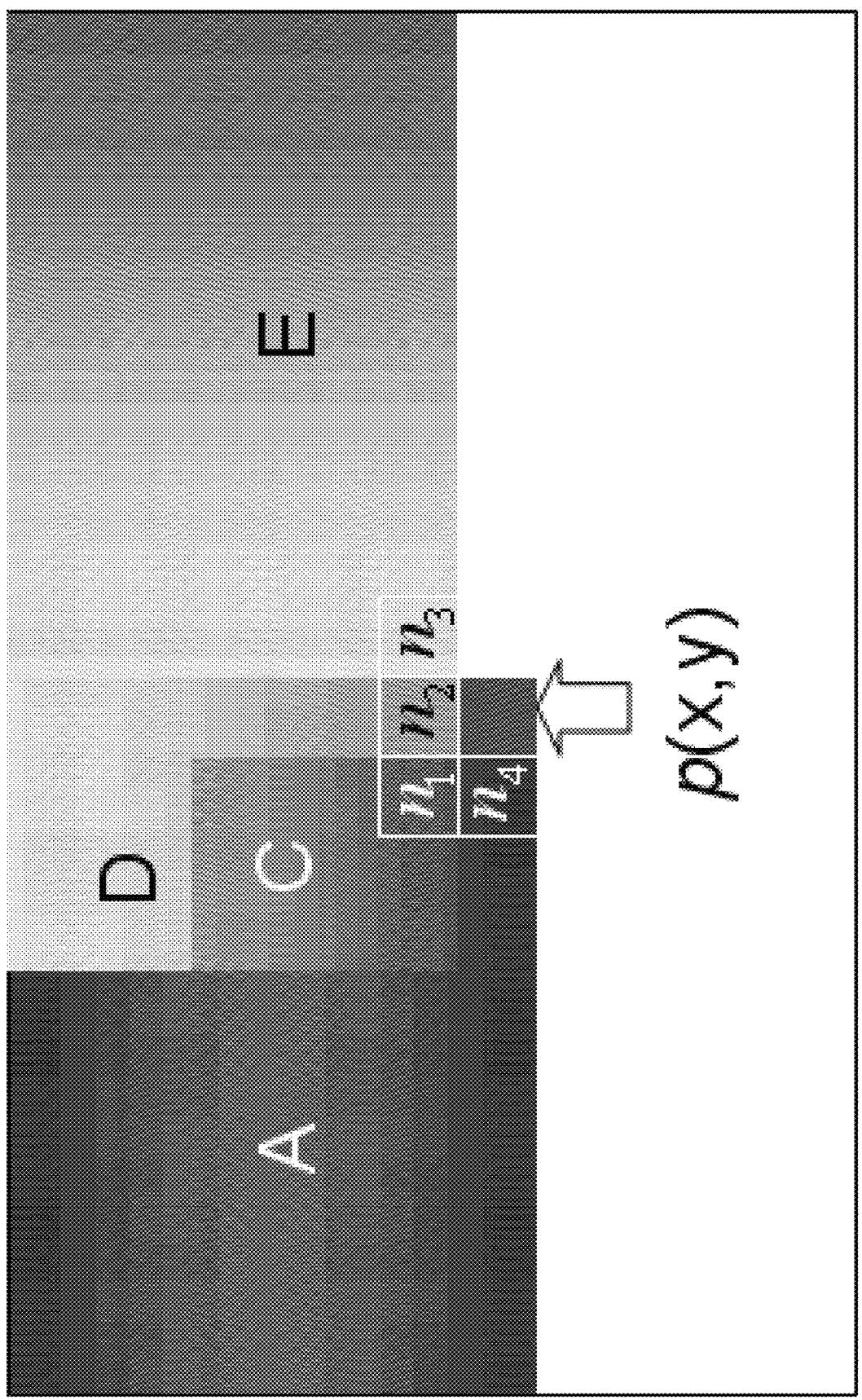
FIG. 3 is a schematic view of difference between pixel features and region features of the present invention.

FIG. 3 is a schematic view of difference between pixel features and region features of the present invention. As shown in FIG. 3, an unmarked pixel p is located in coordinate (x, y), and a grayscale value (indicating brightness thereof) represents brightness of the pixel as gray(p). Four neighboring pixels for the pixel p is represented by $[n_1, n_2, n_3, n_4]$ with corresponding grayscale values $[gray(n_1), gray(n_2), gray(n_3), gray(n_4)]$. Region signs of each of the neighboring pixels are represented by [C,D,E,A]. Suppose average brightness of the region signs serve as region features of the pixel p, than region features corresponding to each of the neighboring pixels are calculated by [Ave(C),Ave(D),Ave(E),Ave(A)]. $Dif(p,n_1)=|gray(p)-gray(n_1)|$ is represented as the grayscale difference of the pixel p and a neighboring pixel $n_1$ and $Dif(p,A)=|gray(p)-Ave(A)|$ is represented as the grayscale difference of the pixel p and a sign "A" of a neighboring pixel region. Suppose grayscale difference of the pixel p and four neighboring pixels is represented by $Dif(p,n_1)<Dif(p,n_4)<Dif(p,n_2)<Dif(p,n_3)$ and grayscale difference of the pixel p and four neighboring pixel regions is represented by $Dif(p,A)<Dif(p,C)<Dif(p,E)<Dif(p,D)$, the pixel-based image segmentation method determines that the pixel p is neighboring to the pixel $n_1$. However, the method determines that the pixel p is neighboring to the region sign A. Specifically, the pixel p is neighboring to the pixel $n_4$. Thus, the result generated using the image segmentation method based on region features of pixels more relatively corresponds to human vision and perception.

For performing image segmentation by simultaneously marking segmented objects without extra operations to determine seeds, the image segmentation method based on region features of pixels of the invention utilizes connected component labeling and introduces a region connected threshold to improve conventional binary connected component labeling such that the present invention can be directly utilized to segment the grayscale/color images without requiring image preprocessing methods to optimize input images. Thus, real-time requirements for high performance can be achieved.

Figure 4:
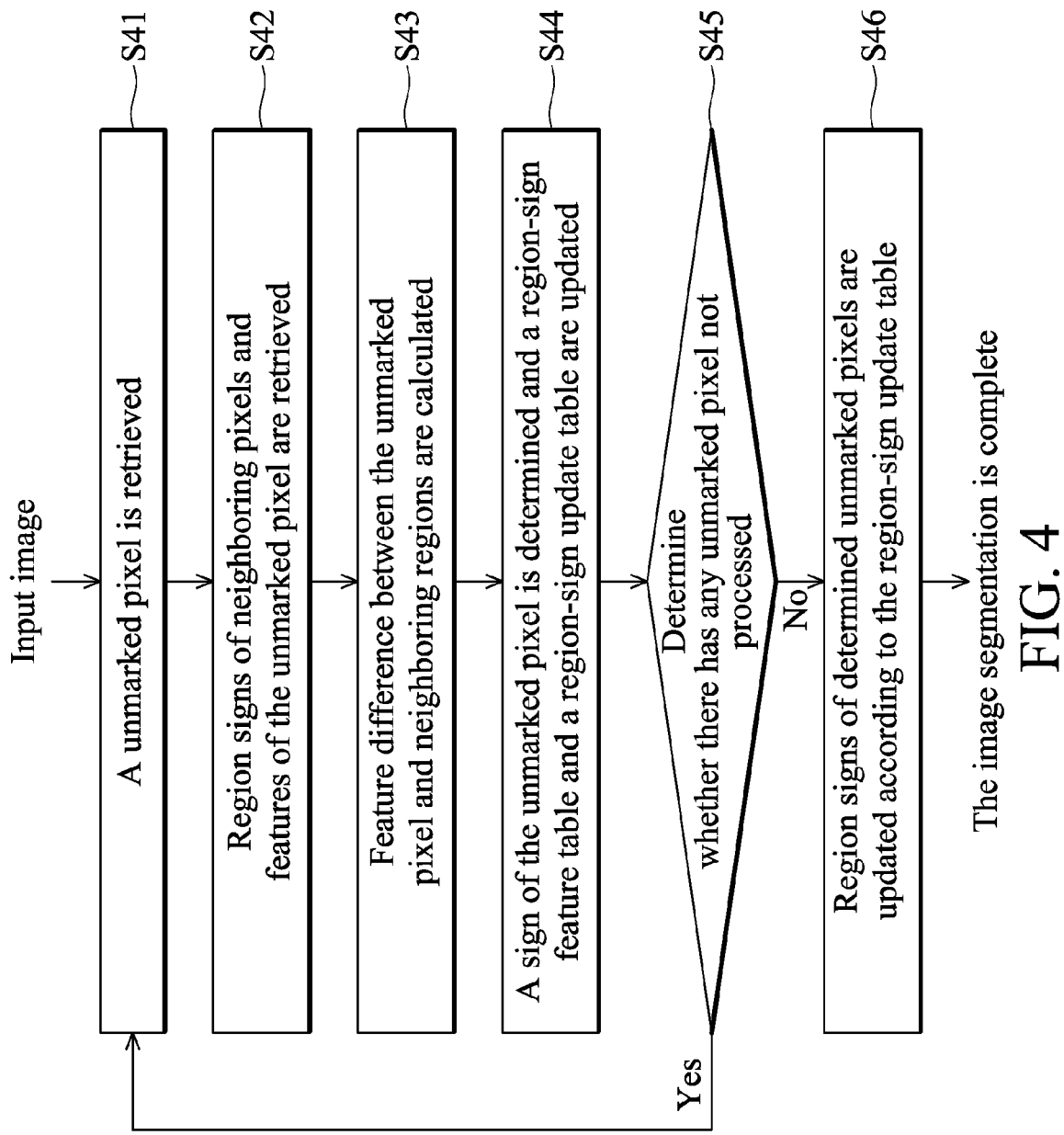
FIG. 4 is a schematic view of a pixel marking method of the present invention.

FIG. 4 is a schematic view of a pixel marking method of the present invention.

The image segmentation method based on region features of pixels of the invention combines image segmentation for pixel region features and connected component labeling, wherein image preprocessing methods are unnecessary, so that an image can be segmented and the segmented objects can be simultaneously marked. The image segmentation method based on region features of pixels of the invention is implemented by the following steps.

An unmarked pixel of an input image is retrieved (step S41), region signs of neighboring pixels and features of the unmarked pixel are retrieved (step S42), and feature difference between the unmarked pixel and neighboring regions are calculated (step S43). A sign of the unmarked pixel is determined according to the feature difference and a region-sign feature table and a region-sign update table are updated according to the determined sign of the unmarked pixel (step S44). It is determined whether there are unmarked pixels that have not yet been processed (step S45). If there are unmarked pixels that have not yet been processed, the process proceeds to step S41, wherein the next unmarked pixel is retrieved from the input image and the previously described steps are repeated. If there are no unmarked pixels that have not yet been processed, all the pixels of the input image are sequentially scanned row by row according to the region-sign update table to update region signs of determined pixels (step S46), thereby completing image segmentation.

FIG. 5A-5E are workflows of pixel marking of the present invention.

For simplicity, an input image is segmented as a 3×3 image, illustrating marking results of each pixel and updating of the region-sign feature table and the region-sign update table. The examples are not to be limitative.

Figure 5A:
Figure 5E:
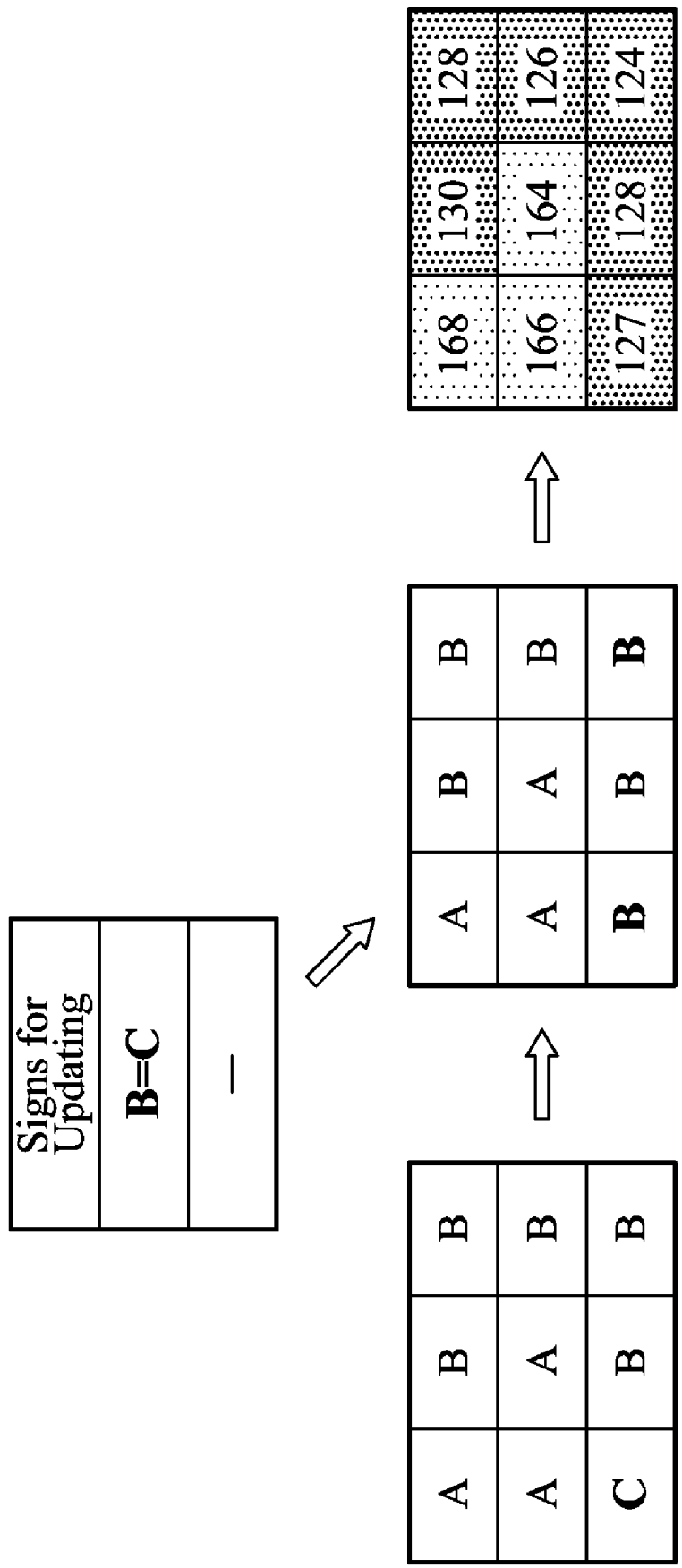

FIG. 5A shows an original image and an ideal segmented result. Processes (1)~(9) shown in FIGS. 5B~5D show marking results for each processed pixel and update of the region-sign feature table and the region-sign update table comprising a currently processed pixel, marking results, the region-sign feature table, and the region-sign update table. The region-sign feature table further comprises fields of a region sign, a region pixel number, the region brightness amount, and average brightness of a region. FIG. 5E shows results of updating pixel signs according to the region-sign update table.

Referring to FIG. 5A, the original image is segmented by 3×3. The region connected threshold $\sigma$ is set to 10, indicating that an unmarked pixel and a neighboring pixel are connected, if region feature difference between the unmarked pixel and the neighboring pixel is less than $\sigma$, and, are unconnected, if the region feature difference is greater than $\sigma$.

Referring to FIG. 5B, in process (1), the pixel symbolized by 168 is the first pixel (an unmarked pixel) so a new region sign "A" is directly assigned to the pixel and is recorded in the region-sign feature table, where the region pixel number is equal to 1, the region brightness amount is equal to 168, and the region average brightness is equal to 168. In process (2), difference between the next unmarked pixel (symbolized by 130) and the region sign A is 38 (|168−130|=38>$\sigma$), so a new region sign "B" is assigned to the pixel and is recorded in the region-sign feature table, where the region pixel number, the region brightness amount, and the region average brightness of the region sign "B" are equal to 1, 130, and 130, respectively.

In the process (3), difference between the next unmarked pixel (symbolized by 128) and the region sign B is 2 (|130−128|=2≦$\sigma$), so that the region sign "B" is assigned to the pixel and the region-sign feature table is updated, where the region pixel number, the region brightness amount, and the region average brightness of the region sign "B" are equal to 2, 258, and 129, respectively. In the process (4), the next unmarked pixel (symbolized by 166) has two neighboring region signs, wherein difference between the unmarked pixel and the region sign A is 2 (|168−166|=2≦$\sigma$) and difference between the unmarked pixel and the region sign B is 37 (|129−166|=37>$\sigma$), so that the region sign "A" is assigned to the pixel and the region-sign feature table is updated, where the region pixel number, the region brightness amount, and the region average brightness of the region sign "A" are equal to 2, 334, and 167, respectively.

In the process (5), the next unmarked pixel (symbolized by 164) has two neighboring region signs, wherein difference between the unmarked pixel and the region sign A is 3 (|167−164|=3≦$\sigma$) and difference between the unmarked pixel and the region sign B is 35 (|129−164|=35>$\sigma$), so that the region sign "A" is assigned to the pixel and the region-sign feature table is updated, where the region pixel number, the region brightness amount, and the region average brightness of the region sign "A" are equal to 3, 498 and 166, respectively. In the process (6), the next unmarked pixel (symbolized by 126) has two neighboring region signs, wherein difference between the unmarked pixel and the region sign A is 40 (|166−126|=40>$\sigma$) and difference between the unmarked pixel and the region sign B is 3 (|129−126|=33≦$\sigma$), so that the region sign "B" is assigned to the pixel and the region-sign feature table is updated, where the region pixel number, the region brightness amount, and the region average brightness of the region sign "B" are equal to 3, 384, and 128, respectively.

In the process (7), difference between the next unmarked pixel (symbolized by 127) and the region sign A is 2 (|166−127|=39>$\sigma$), so that the region sign "C" is assigned to the pixel and the region-sign feature table is updated, where the region pixel number, the region brightness amount, and the region average brightness of the region sign "C" are equal to 1, 127, and 127, respectively. In the process (8), the next unmarked pixel (symbolized by 128) has three neighboring region signs, wherein difference between the unmarked pixel and the region sign A is 38 (|166−128|=38>$\sigma$), difference between the unmarked pixel and the region sign B is 0 (|128−128|=0≦$\sigma$), and difference between the unmarked pixel and the region sign C is 1 (|127−128|=1≦$\sigma$), so that the region sign "B" is assigned to the pixel and the region-sign feature table is updated, where the region pixel number, the region brightness amount, and the region average brightness of the region sign "B" are equal to 4, 512, and 128, respectively. Meanwhile, "B=C" is recorded in the region-sign update table.

In the process (9), the next unmarked pixel (symbolized by 124) has two neighboring region signs, wherein difference between the unmarked pixel and the region sign A is 42 (|166−124|=42>$\sigma$) and difference between the unmarked pixel and the region sign B is 4 (|128−124|=4<$\sigma$), so that the region sign "B" is assigned to the pixel and the region-sign feature table is updated, where the region pixel number, the region brightness amount, and the region average brightness of the region sign "B" are equal to 5, 636, and 127, respectively. In FIG. 5E, all marked pixels are sequentially searched and region signs of pixels are updated according to the region-sign update table. Thus, the bottom-left region sign "C" (at Row 3, Column 1) is replaced by "B".

The image segmentation method based on region features of pixels of the invention does not perform image preprocessing methods to remove noise, even if the original image comprises a lot of noise. Thus, efficiency of segmentation results is not affected by noise.

Figure 6:
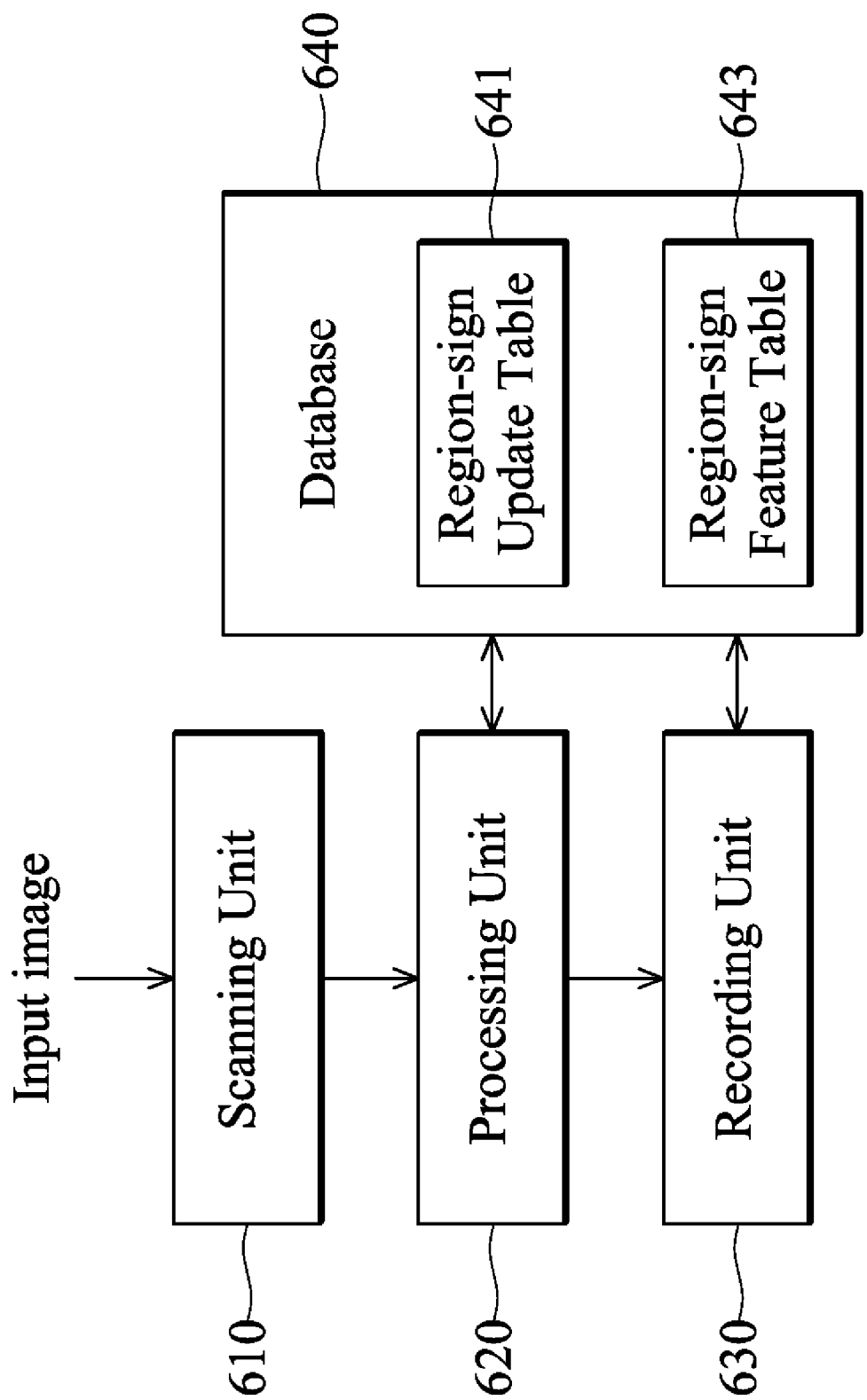
FIG. 6 is a schematic view of an image segmentation system based on region features of pixels of the present invention.

FIG. 6 is a schematic view of an image segmentation system based on region features of pixels of the present invention.

The system is loaded in an electronic device to provide image segmentation. The system comprises a scanning unit 610, a processing unit 620, a recording unit 630, and a database 640. The database 640 further comprises a region-sign update table 641 and a region-sign feature table 643. The scanning unit 610 retrieves a grayscale/color image and sequentially scans pixels of the image row by row. The processing unit 620 retrieves region features (recorded in the region-sign feature table 643) of each of the neighboring pixels according to the scanning results and determines signs of unmarked pixels of the image according to the region features of the neighboring pixels. The recording unit 630 records the updated region features in the region-sign feature table 643 and records the updated pixel signs in the region-sign update table 641. The scanning unit 610 further sequentially scans the pixels of the input image row by row and the recording unit 630 correctly updates region signs which should be identical but are different due to the scanning sequence.

The processing unit 620 obtains an unmarked pixel, extracts the unmarked pixel and that of region signs corresponding to neighboring pixels for the unmarked pixel features, and compares the features of the unmarked pixel with the features of region signs corresponding to the neighboring pixels to determine a sign of the unmarked pixel. The recording unit 630 updates features of corresponding region signs according to the determined sign of the unmarked pixel and updates the region-sign update table 641 and the region-sign feature table 643 while transforming the unmarked pixel to a marked pixel.

With respect to the pixel marking, the scanning unit 610 retrieves an unmarked pixel of an input image and the processing unit 620 retrieves region signs of neighboring pixels (named neighboring regions in the following) and features of the unmarked pixel, calculates feature difference between the unmarked pixel and neighboring regions, and determines a sign of the unmarked pixel according to the feature difference. The recording unit 630 updates the region-sign update table 641 and the region-sign feature table 643 according to the determined sign of the unmarked pixel. The processing unit 620 determines whether there are unmarked pixels that have not yet been processed. If there are unmarked pixels that have not yet been processed, the scanning unit 610 retrieves the next unmarked pixel from the image and the described process is repeated. If there are no unmarked pixels that have not yet been processed, the recording unit 630 sequentially scans all the pixels of the image row by row according to the region-sign update table to update region signs of determined pixels, thereby completing image segmentation.

In another embodiment, a field (final sign) is added to the region-sign feature table for recording "signs for updating" in the region-sign update table. Thus, both the tables are merged to enhance efficiency.

FIG. 7A~7D are workflows of pixel marking of the present invention. When a sign of an unmarked pixel is determined, if an unmarked pixel and a marked neighboring pixel reside corresponding to the same region sign but they are assigned different region signs due to sequential scanning (as shown by the process (8) shown in FIG. 7C), the region sign to be updated is recorded in the "final sign" field to be the basis for region sign updating (as shown in FIG. 7D). Further, contents recorded in the "final sign" field are identical to that recorded in the "sign" field.

An embodiment of the an image segmentation method and system based on region features of pixels considers human vision and perception and can be applied to current image segmentation methods, such as image segmentation based on watershed algorithm, in which the region growing uses region features of neighboring pixels instead of pixel features of neighboring pixels. Thus, performing image preprocessing operations to remove noise is not required.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image segmentation method based on region features of pixels, comprising:
    when an input image is retrieved, sequentially scanning pixels of the input image row by row;
    determining signs of unmarked pixels of the input image according to region features of neighboring pixels for each of the pixels of the input image;
    updating a region-sign feature table according to pixel signs of the input image;
    recording the updated pixel signs to generate a region-sign update table;
    sequentially scanning the pixels of the input image row by row; and
    updating region signs of related pixels according to the region-sign update table;
    wherein determining the signs of unmarked pixels further comprises:
        extracting features of an unmarked pixel and features of region signs corresponding to neighboring pixels for the unmarked pixel when the unmarked pixel is obtained;

comparing the features of the unmarked pixel with the features of region signs corresponding to the neighboring pixels to determine a sign of the unmarked pixel;

updating features of corresponding region signs according to the determined sign of the unmarked pixel;

recording the updated region signs; and updating the region-sign feature table and the region-sign update table so that the unmarked pixel becomes a marked pixel.

2. The image segmentation method based on region features of pixels as claimed in claim 1, wherein average brightness of region signs of a pixel serves as region features corresponding to the pixel.

3. The image segmentation method based on region features of pixels as claimed in claim 2, wherein region features corresponding to each neighboring pixel are obtained according to the average brightness of the region signs of the pixel.

4. The image segmentation method based on region features of pixels as claimed in claim 3, wherein the pixel is determined to be neighboring to which pixel according to grayscale difference between the pixel and each of the neighboring pixels.

5. The image segmentation method based on region features of pixels as claimed in claim 1, wherein the region-sign update table is merged to the region-sign feature table.

6. An image segmentation system based on region features of pixels, comprising:

a database, comprising a region-sign feature table and a region-sign update table;

a scanning unit, retrieving an input image and sequentially scanning pixels of the input image row by row;

a processing unit, retrieving region features of each of the neighboring pixels according to the scanning results and determining signs of unmarked pixels of the input image according to the region features of the neighboring pixels; and a recording unit, recording the updated pixel signs in the region-sign update table, wherein, the scanning unit further sequentially scans the pixels of the input image row by row and the recording unit updates region signs of related pixels according to the region-sign update table;

wherein determining the signs of unmarked pixels further comprises:

when an unmarked pixel is obtained, the processing unit extracts features of the unmarked pixel and features of region signs corresponding to neighboring pixels for the unmarked pixel and compares the features of the unmarked pixel with the features of region signs corresponding to the neighboring pixels to determine a sign of the unmarked pixel, the recording unit updates features of corresponding region signs according to the determined sign of the unmarked pixel, records the updated region signs, and updates the region-sign feature table and the region-sign update table so that the unmarked pixel becomes a marked pixel.

7. The image segmentation system based on region features of pixels as claimed in claim 6, wherein average brightness of region signs of a pixel serves as region features corresponding to the pixel.

8. The image segmentation system based on region features of pixels as claimed in claim 7, wherein region features corresponding to each neighboring pixel are obtained according to the average brightness of the region signs of the pixel.

9. The image segmentation system based on region features of pixels as claimed in claim 8, wherein the pixel is determined to be neighboring to which pixel according to grayscale difference between the pixel and each of the neighboring pixels.

10. The image segmentation system based on region features of pixels as claimed in claim 6, wherein the region-sign update table is merged to the region-sign feature table.

11. A non-transitory computer-readable medium encoded with computer executable instructions for performing an image segmentation method based on region features of pixels, wherein the computer executable instructions comprise:

when an input image is retrieved, sequentially scanning pixels of the input image row by row;

determining signs of unmarked pixels of the input image according to region features of neighboring pixels for each of the pixels of the input image;

updating a region-sign feature table according to pixel signs of the input image;

recording the updated pixel signs to generate a region-sign update table;

sequentially scanning the pixels of the input image row by row; and updating region signs of related pixels according to the region-sign update table;

wherein determining the signs of unmarked pixels further comprises:

extracting features of an unmarked pixel and features of region signs corresponding to neighboring pixels for the unmarked pixel when the unmarked pixel is obtained;

comparing the features of the unmarked pixel with the features of region signs corresponding to the neighboring pixels to determine a sign of the unmarked pixel;

updating features of corresponding region signs according to the determined sign of the unmarked pixel;

recording the updated region signs; and updating the region-sign feature table and the region-sign update table so that the unmarked pixel becomes a marked pixel.

12. The non-transitory computer-readable medium as claimed in claim 11, wherein average brightness of region signs of a pixel serves as region features corresponding to the pixel.

13. The non-transitory computer-readable medium as claimed in claim 12, wherein region features corresponding to each neighboring pixel are obtained according to the average brightness of the region signs of the pixel.

14. The non-transitory computer-readable medium as claimed in claim 13, wherein the pixel is determined to be neighboring to which pixel according to grayscale difference between the pixel and each of the neighboring pixels.

* * * * *